(12) United States Patent
Umbaugh, Jr.

(10) Patent No.: US 7,426,802 B2
(45) Date of Patent: Sep. 23, 2008

(54) SEED GERMINATION AND PLANT SUPPORTING UTILITY

(76) Inventor: Raymond E. Umbaugh, Jr., 6518 Barnacle St., Boulder, CO (US) 80301

( * ) Notice: Subject to any disclaimer, the term of this patent is extended or adjusted under 35 U.S.C. 154(b) by 861 days.

(21) Appl. No.: 10/621,618

(22) Filed: Jul. 18, 2003

(65) Prior Publication Data

US 2005/0011118 A1    Jan. 20, 2005

(51) Int. Cl.
*A01G 31/00* (2006.01)
*A01G 31/06* (2006.01)

(52) U.S. Cl. .................................. 47/62 R; 47/62 A

(58) Field of Classification Search .................. 47/18, 47/19.1, 19.2, 62 R, 62 A, 62 C, 62 E, 62 N
See application file for complete search history.

(56) References Cited

U.S. PATENT DOCUMENTS

| | | | |
|---|---|---|---|
| 1,987,255 A | 1/1935 | Husted | |
| 2,175,113 A | 10/1939 | Fischer | |
| 2,834,153 A | 5/1958 | Fearn | |
| 3,961,444 A | 6/1976 | Skaife | |
| 4,057,930 A * | 11/1977 | Barham | 47/61 |
| 4,100,699 A | 7/1978 | Skaife | |
| 4,106,235 A | 8/1978 | Smith | |
| 4,192,097 A | 3/1980 | Smith | |
| 4,355,484 A | 10/1982 | Mandish | |
| 4,379,375 A | 4/1983 | Eisenberg et al. | |
| 4,397,114 A | 8/1983 | Skaife | |
| 4,514,930 A | 5/1985 | Schorr et al. | |
| 4,531,324 A * | 7/1985 | Yang et al. | 47/81 |
| 4,669,217 A * | 6/1987 | Fraze | 47/64 |
| 4,697,382 A | 10/1987 | Koeniger | |
| 5,225,342 A * | 7/1993 | Farrell | 435/430 |
| 5,324,657 A * | 6/1994 | Tanny | 435/420 |
| 5,400,544 A * | 3/1995 | Wien | 47/33 |
| 5,525,505 A | 6/1996 | Young et al. | |
| 5,597,731 A | 1/1997 | Young et al. | |
| 5,611,172 A * | 3/1997 | Dugan et al. | 47/1.01 R |
| D402,296 S | 12/1998 | Schorr | |
| 6,233,870 B1 * | 5/2001 | Horibata | 47/62 R |
| 6,442,893 B1 * | 9/2002 | Lai | 47/62 R |

FOREIGN PATENT DOCUMENTS

EP    0052264    *    5/1982

(Continued)

OTHER PUBLICATIONS

English translation of Japanese patent JP 4-88928.*

(Continued)

*Primary Examiner*—David J Parsley
(74) *Attorney, Agent, or Firm*—Harold A. Burdick

(57) ABSTRACT

A seed germination and plant supporting utility are disclosed. The utility includes a spacer having a passageway therethrough between opposite spacer ends. Mesh is positioned at both ends of the spacer. First and second retainers are receivable at the ends of the spacer adjacent to the mesh positioned thereat and have openings therethrough in correspondence with the spacer passageway. The mesh is thus held apart a selected distance with the passageway through the spacer enshrouded by the mesh yet accessible at both ends through the mesh and the openings in the retainers.

20 Claims, 6 Drawing Sheets

FOREIGN PATENT DOCUMENTS

| | | | |
|---|---|---|---|
| JP | 3-290123 | * | 12/1991 |
| JP | 4-88928 | * | 3/1992 |
| JP | 6-38640 | * | 2/1994 |

OTHER PUBLICATIONS

Aeroponics International, "Aeroponic Seed Germination Accessories", Date Unknown, www.biocontrols, com/aerol8e.htm.

ACI-Hydroponics, "Clonator Valentine's Sale". Date Unknown, www.aci-hydroponics.com/clonator.htm.

Future Garden, "6 in. net grow cups", Date Unknown, www.futuregarden.com/shop/10-1030.html?id=9aMHf465.

Roberto, Keith, "How To Hydroponics", 2000, pp. 57-59, Distributed by Future Garden Inc.

Lil'Sprout Hydrogardening Appliances, Untitled, Date Unknown, www.lilsprout.com/cart/agora.egi?page-j2000.html.

Genisis Technology, Inc., "Air-a-ponics in action . . . Genisis Rooting System" date unknown, Advertising Matter.

* cited by examiner

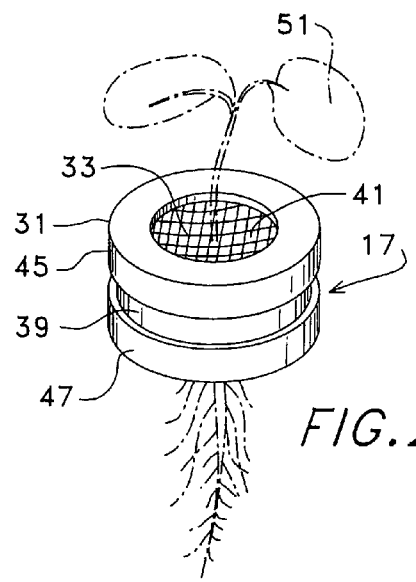
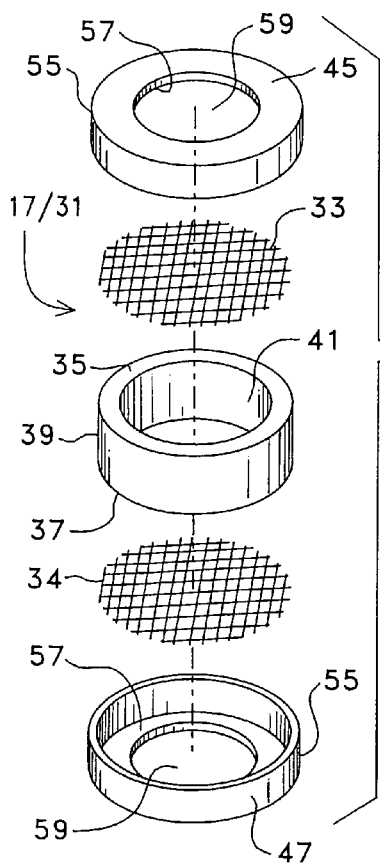
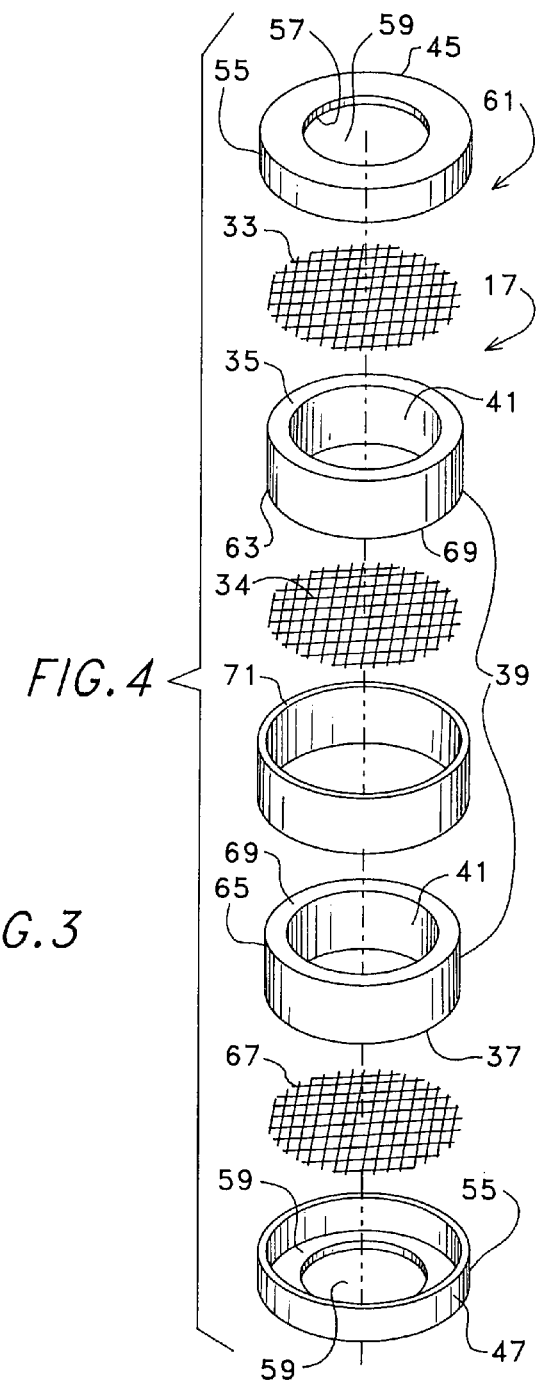

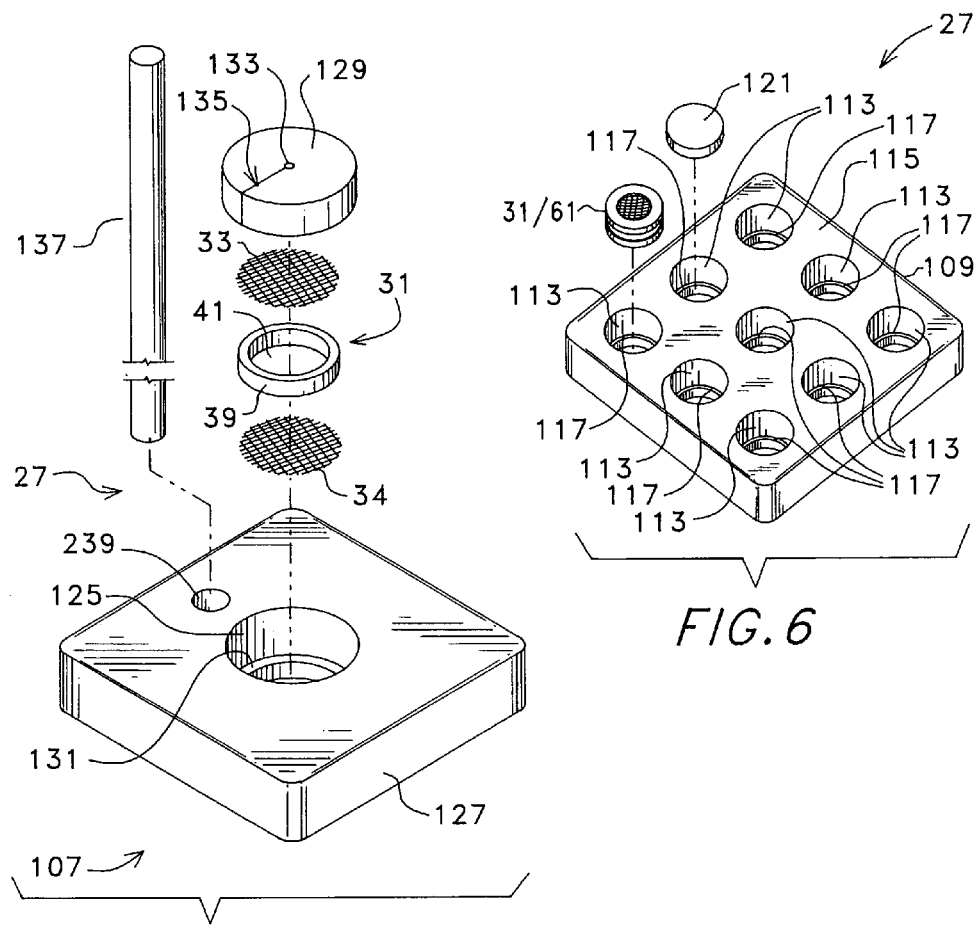
FIG. 6
FIG. 7
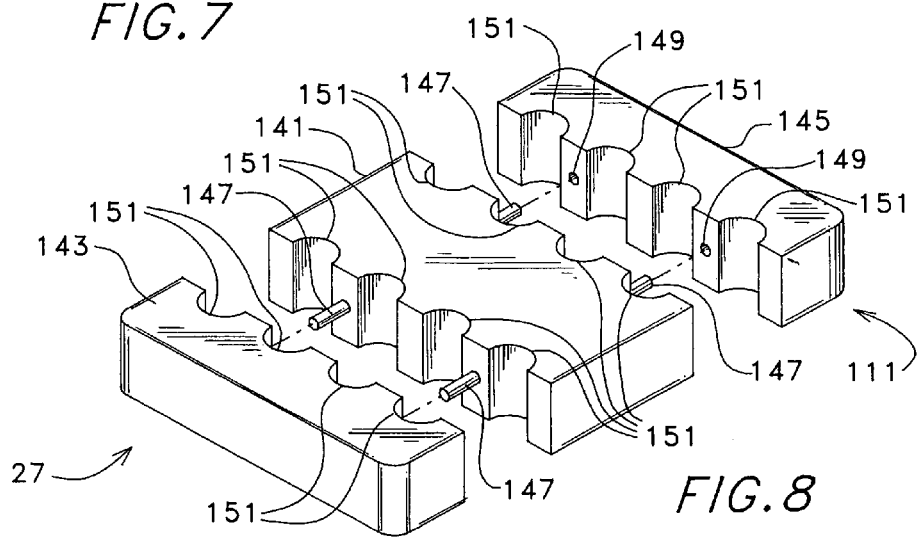
FIG. 8

SEED GERMINATION AND PAINT SUPPORTING UTILITY

FIELD OF THE INVENTION

This invention relates to plant propagating apparatus and methods, and, more particularly, relates to such apparatus for plant culture in the absence of root supporting growth media such as soil or the like.

BACKGROUND OF THE INVENTION

A variety of growing methods and systems for use in the field of aeroponics and/or hydroponics have been heretofore suggested and/or utilized. These methods and systems have employed various means for germinating seeds and for supporting seedlings and plants during their growth cycle. Such means as have been heretofore employed have often required transplanting of a seedling once germinated (risking plant damage), and/or have not adequately addressed plant support over the lifecycle of the plant.

Support of the growing plant is of particular concern in culture where no root anchoring growth medium (such as soil or the like) is present, and must be addressed to better assure proper development of the plant. Heretofore utilized arrangements have often required plant support to be reconfigured multiple times during the growth of the plant from seedling to full term.

As may be appreciated, therefore, improvement of systems for seed germination and support of plants in aeroponic and/ or hydroponic culture could be utilized. In particular, it would be beneficial to provide systems wherein handling of plants from seed germination to full term growth is minimized or eliminated.

SUMMARY OF THE INVENTION

This invention provides a seed germination and plant supporting utility that allows a seed germinated utilizing the utility to grow to full term in the same utility without benefit of root supporting plant growth media. The utility thus minimizes or eliminates handling of the plant during its growth cycle, and will be particularly useful in aeroponic growing systems, hydroponic growing systems, and/or for seed germination and initial seedling growth in preparation for planting. In most applications, the utility provides adequate support for a plant over its full growth cycle (from seedling to full term) without need for plant support reconfiguration.

The germination and supporting utility includes a spacer having a central opening defining a passageway therethrough between spacer ends, or sides. Mesh is maintained at both sides of the spacer so that the mesh is held spaced apart a selected distance and the central opening is enshrouded by the mesh.

The spacer is preferably ring shaped, having an inside diameter and outside diameter. The mesh preferably includes at least first and second fiber mesh swathes each with a diameter greater than the inside diameter of the spacer and positioned at different ones of the opposite sides of the spacer. Means are preferably provided for retaining utility assemblage at each of the opposite ends of the spacer ring.

The retaining means preferably utilize first and second retainers (removable ring shaped retainer caps, for example) associable with the spacer at the first and second ends thereof adjacent to the mesh. Each of the retainers has an opening therethrough in correspondence with the spacer passageway when associated with the spacer, and, in at least one embodiment of this invention, serve to anchor the mesh at the spacer.

It is therefore an object of this invention to provide a seed germination and plant supporting utility.

It is another object of this invention to provide a seed germination and plant supporting utility that allows a seed germinated utilizing the utility to grow to full term in the same utility without root supporting plant growth media.

It is another object of this invention to provide a seed germination and plant supporting utility that minimizes or eliminates handling of the plant during its growth cycle.

It is still another object of this invention to provide a seed germination and plant supporting utility that is particularly useful in aeroponic growing systems, hydroponic growing systems, and/or for seed germination and initial seedling growth in preparation for planting.

It is yet another object of this invention to provide a seed germination and plant supporting utility that provides adequate support for a plant over its full growth cycle (from seedling to full term) without need for plant support reconfiguration.

It is another object of this invention to provide a seed germination and plant supporting utility that includes a spacer having a central opening therethrough between sides of the spacer, and mesh maintained at both of the sides of the spacer, wherein the mesh is held spaced apart a selected distance by the spacer and enshrouds the central opening.

It is still another object of this invention to provide a seed germination and plant supporting utility including at least a first spacer having a passageway therethrough between first and second ends of the first spacer, a first mesh swathe positioned at the first end of the first spacer, a second mesh swathe positioned at the second end of the first spacer, and first and second retainers associable with the first spacer at the first and second ends thereof, respectively, adjacent to the first and second mesh swathes positioned thereat, each of the retainers having an opening therethrough in correspondence with the first spacer passageway when associated with the first spacer.

It is yet another object of this invention to provide a seed germination and plant supporting utility including a spacer ring having a central opening therethrough between opposite ends of the spacer ring, the spacer ring having an inside diameter adjacent the central opening and outside diameter, first and second mesh each with a diameter greater than the inside diameter of the spacer ring and each positioned at a different one of the opposite ends of the spacer ring, and retaining means operative at each of the opposite ends of the spacer ring for maintaining utility assemblage.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 2 is a perspective view of a first embodiment of one utility of this invention;

FIG. 3 is an exploded view of the utility illustrated in FIG. 2;

FIG. 4 is an exploded view of a second embodiment of a utility of this invention;

FIG. 6 is an exploded view of one embodiment of the utility maintenance platforms of FIG. 5B;

FIG. 7 is an exploded view of a second embodiment of the utility maintenance platforms of FIG. 5B in combination to provide another configuration of the utility of this invention;

FIG. 8 is an exploded view of a cutting maintenance platform as also shown in FIG. 5B;

DESCRIPTION OF THE INVENTION

Figure 1:
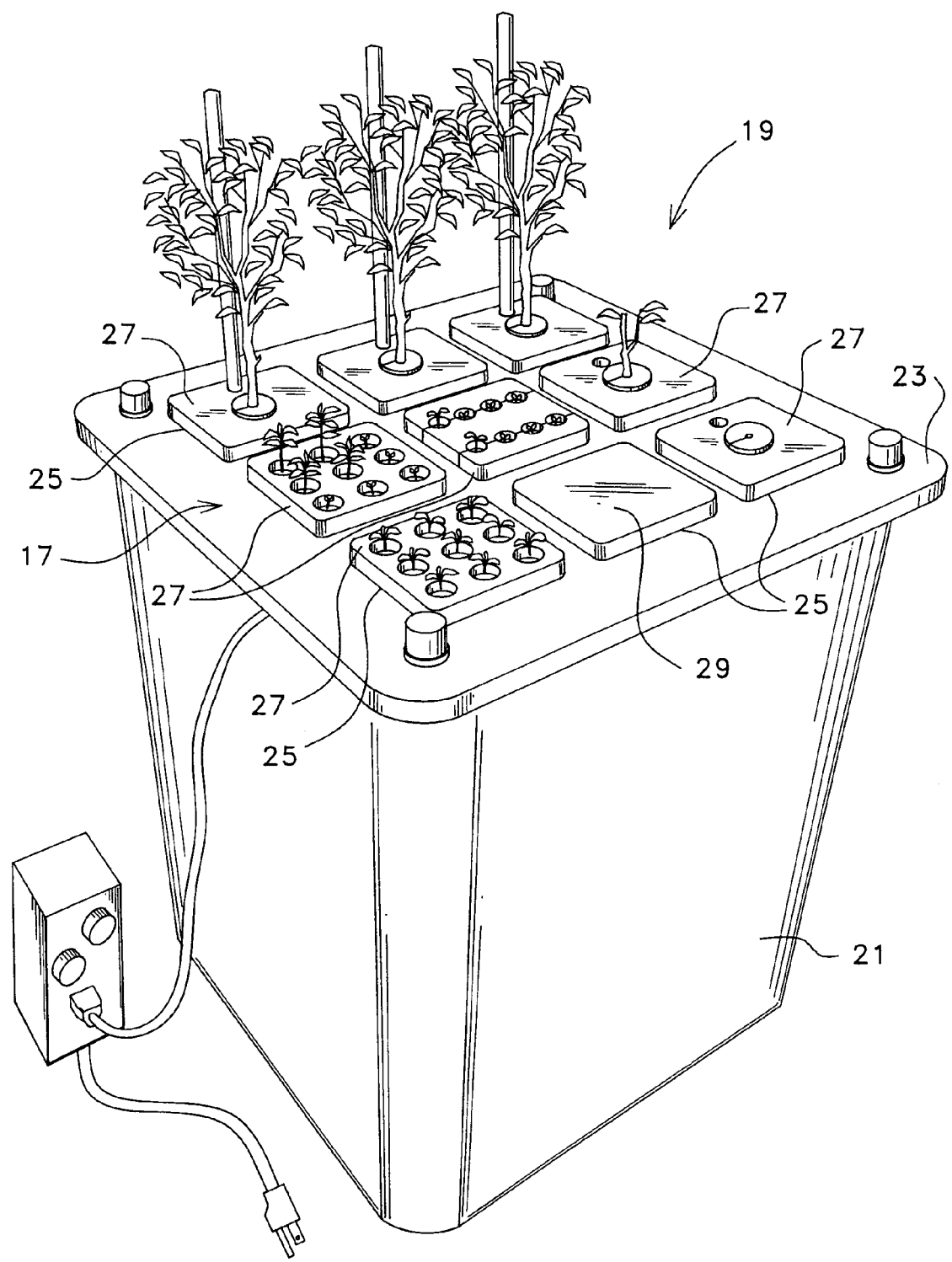
FIG. 1 is a perspective view of a aeroponic growing system employing a number of the germination and supporting utilities of this invention.
Figure 5A:
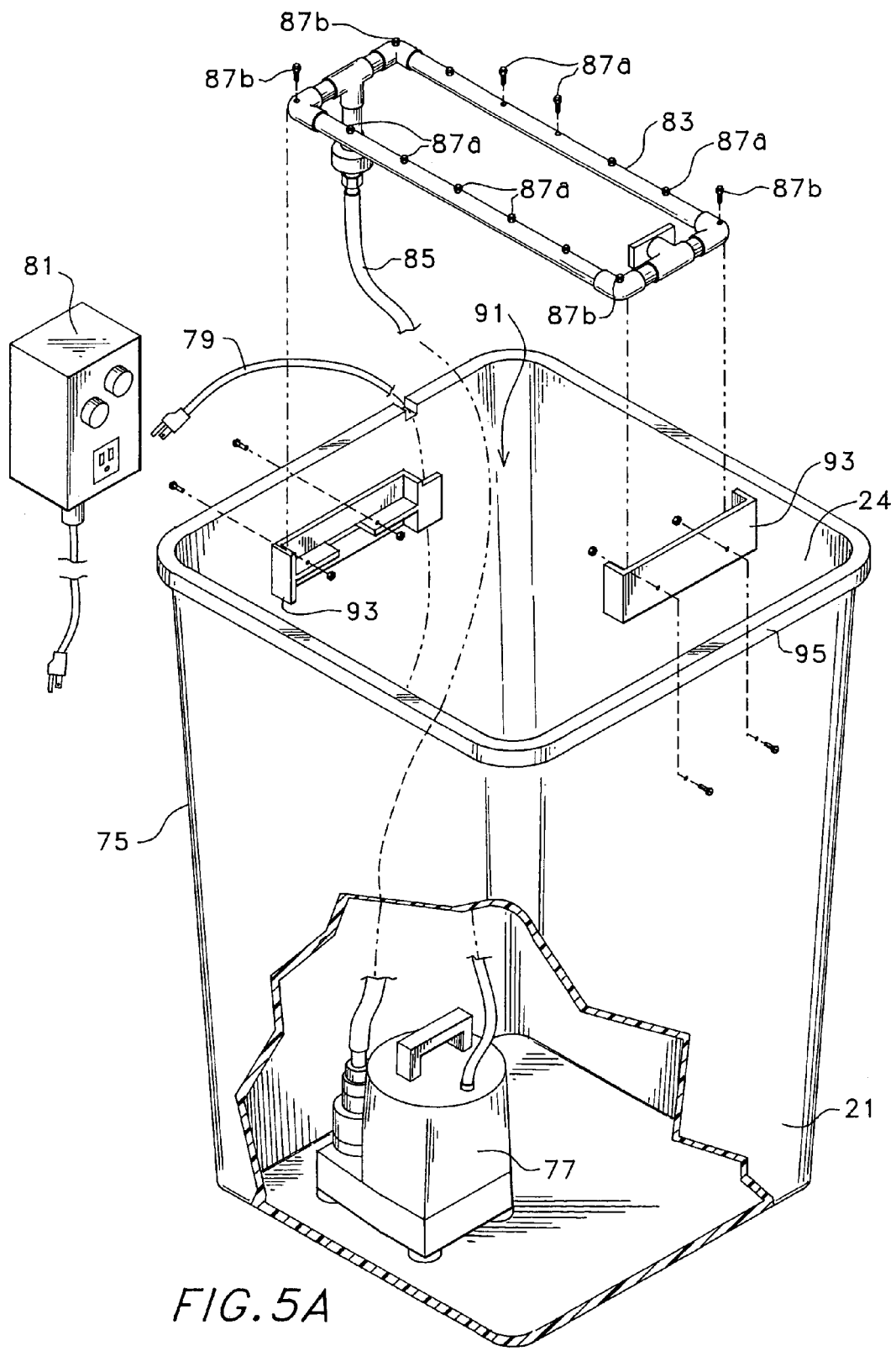
FIG. 5A is an exploded view of the containment and feeding apparatus of the system of FIG. 1.

A multi-element seed germination and plant supporting utility 17 is shown in FIG. 1, in an aeroponic growing system 19 in this particularly embodiment (it being understood that the utility, or portions thereof, could as well be employed in hydroponic systems and/or for seed germination applications). Utility 17, in such an aeroponic growing system 19, would include a containment and feeding apparatus 21 having removable plant positioning structure 23 configured to be received at the upper opening 24 therein (FIG. 5A). Multiple receiving stations 25 are provided at structure 23 for receipt of variously configured plant maintenance platforms 27 and or filler blanks 29, all as will be described in greater detail hereinbelow.

Turning to FIGS. 2 and 3, a first embodiment of a utility 31 of the seed germination and plant supporting utility 17 of this invention primarily of concern herein is shown. Utility portion 31 includes upper fiber mesh swathe 33 and lower fiber mesh swath 34 held at ends (or sides) 35 and 37 of spacer 39 having a central opening 41 therethrough defining a passageway. As utilized herein, the term mesh implies any interlocking or intertwining arrangement, construction or other network of material or structure that defines a network of spaces. Mesh 33 and 34 can be any material suitable to the task, including metal, thermoplastic or fabric (nylon, for example) screen, but is preferably cotton or other expandable and degradable fiber material.

While mesh 33 and 34 are shown as two separate elements, it should be appreciated that a single mesh swathe encompassing both ends 35 and 37 of spacer 39 could be utilized. Mesh 33 and 34 can be retained at spacer 39 in any convenient manner (gluing, welding or the like would be acceptable), but utility assemblage in this embodiment is preferably maintained utilizing removable retainers 45 and 47 which anchor mesh 33 and 34 at spacer ends 35 and 37.

This configuration of utility 31 provides a seed germination pod, or module, that supports a seedling (51) to full growth after germination. Mesh 33/34 is held spaced apart a selected distance by spacer 39 and enshrouds passageway 41. Mesh 33 is preferably more loosely fit at spacer 39 than mesh 34 to provide a seed centering sag at mesh 33, and preferably has a mesh size greater than the mesh size of mesh 34. As a seed deposited on upper mesh 33 develops its first roots during germination, the roots grow through mesh 33 with little resistance down through passageway 41 of spacer 39 to mesh 34. Since mesh size of mesh 34 is preferably smaller, greater resistance is met by roots thereat, and the plant begins to develop hair roots that attach to mesh 34 as they continue to grow down from utility 31 (into apparatus 21, for example). This provides a firm bedding for the roots at mesh 33 and 34 and causes the plant to grow straight (toward its light source).

While a variety of shapes and configurations could be conceived, in particular as shown herein spacer 39 is preferably a ring shaped collar having blunt surfaces at ends 35 and 37. The inside and outside diameter of spacer 39 at ends 35 and 37 may vary as required by the particular application (a 0.75 inch inside diameter will be adequate for most single plantings). In such case, the diameter of mesh swathes 33 and 34 should be at least as great as the inside diameter of spacer 39. Retainers 45 and 47 in such case include a ring shaped body 55 of a size to fit snugly over ends 35 and 37 of spacer 39. Annular retaining lip 57 extends from one end of the ring shaped body 55 of retainers 45/47, inwardly at opening 59 defined through retainers 45/47, thus providing an end cap with openings 59 in correspondence with passageway 41 of spacer 39 when retainers 45/47 are associated with spacer 39. By this means, mesh 33/34 are anchored between the blunt surfaces at ends 35/37 of spacer 39 and retainer lips 57 of retainers 45/47. To facilitate ready application and removal of retainers 45/47, the retainers should be made of a resilient but yieldable material (many types of non-volatile thermoplastic would suffice in this application). Spacer 39 should be of a firmer material (metal, plastic or the like).

A second embodiment 61 of a utility of the seed germination and plant supporting utility 17 of this invention is shown in FIG. 4 that provides more extensive root support for a plant germinated therein. In this embodiment, spacer 39 includes first and second spacer components 63 and 65, each defining a part of central opening/passageway 41. As before, mesh 33 and 34 are held spaced apart a selected distance by spacer component 63 of spacer 39. Fabric mesh swathe 67 is positioned at end 37 at spacer component 65 of spacer 39. Each spacer component 63/65 has an interfacing surface 69 between which mesh 34 is retained, the spacer components being held together thereat by retainer 71 (in this particular embodiment, a ring shaped retainer made to fit tightly at each interfacing end of components 63/65). Mesh 67 and mesh 33 are anchor d utilizing retainers 45 and 47 as heretofore described, mesh 67 and mesh 34 being thus held a selected distance apart by spacer component 65 of spacer 39.

Mesh size of mesh 67 should preferably be smaller or the same as mesh size of mesh 34 (which is smaller than mesh size of mesh 33). Larger plants requiring more extensive root support may benefit from the third tier supporting mesh as shown in FIG. 4. As may be appreciated, additional tiers may be added (though it is felt that such will be rarely necessary for most applications).

Figure 5B:
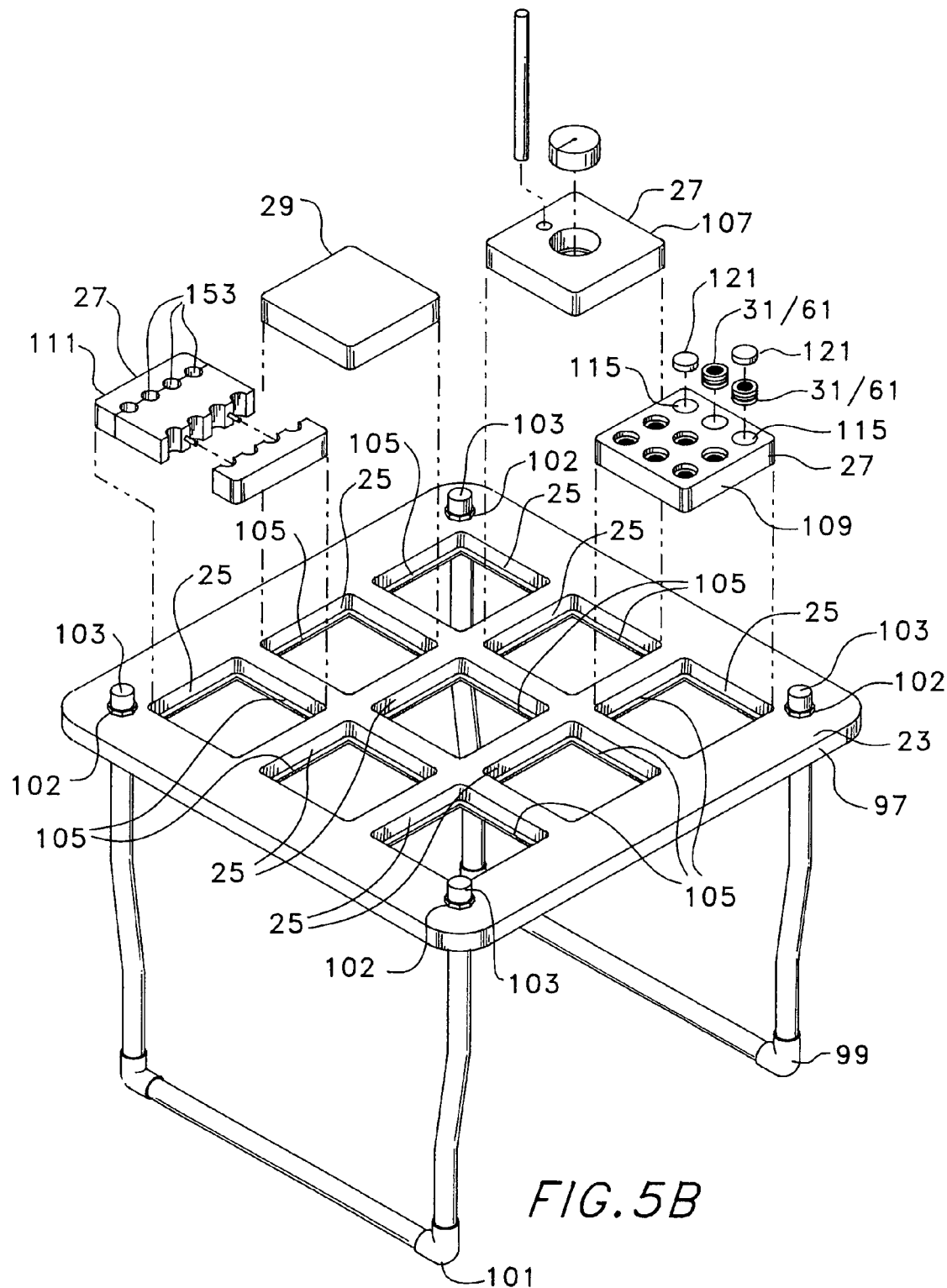
FIG. 5B is an exploded view of the positioning structure of the system of FIG. 1 including several utility maintenance platforms.

Turning now to FIGS. 5A and 5B, containment and feeding apparatus 21 includes basin 75 for containing fluid (water vapor, liquid water and/or water/vapor/nutrient mixture), submersible pump 77 having power cord 79 connected with user settable timer 81 (for timing and activating the pump in duration selected on/off cycles), and misting arm 83 connected through tube 85 to pump 77. Misting arm 83 distributes pumped water/nutrient held in basin 75 as a mist through jets 87 (flat jets 87a and corner jets 87b being provided) to the roots of plants held in the utility and exposed in chamber 91 of basin 75 or at seeds and/or seedlings developing at a utility 31/61. Misting arm 83 is held at basin 75 on brackets 93 mounted within chamber 91 of the basin. An upper support rim 95 provides rigidity and strength at the upper opening 24 to chamber 91 of basin 75. The various components may be constructed of conventional materials suitable to their task.

Plant positioning structure 23 (FIG. 5B) includes horizontal table 97 connected with leg structures 99 and 101 (made of plastic or light metal pipe, for example, and held at table 97 through openings 102 by threaded caps 103 engageable with mutable threads at the leg structures 99/101). Table 97 rests on support rim 95 of basin 75 of apparatus 21 with leg structures 99/101 within chamber 91 when installed, and is readily removable therefrom, structures 99/101 holding roots spaced from a selected resting surface when table 97 is freestanding (thus protecting plant root growth). The plurality or receiving stations 25 are voids in table 97 sized and shaped to receive the various platforms 27 and/or filler blanks 29 (various sizes and shapes could be conceived of). Each station 97 is configured with a rim shelf 105 around the void upon which platforms 27 or blanks 29 are supported in the void.

Filler blanks 29 are provided merely to cap an unused station 25 to avoid loss of fluid therethrough. Removable plant maintenance platforms 27 are provided to hold plants and/or plant cuttings, and include four basic types (all as shown in greater detail in FIGS. 6 through 10): single unit platforms 107 (as shown herein configured for larger plants) and multi-purpose multiple unit platforms 109, both of which may be utilized with a utility 31/61; and cuttings support platforms 111 and/or 112.

Multi-purpose, multiple unit platform 109 (FIG. 6) includes a plurality of openings 113 through platform wall 115 sized and shaped to receive a particular utility 31/61 therein. Each opening 115 may be utilized for cuttings. However, each opening 115 includes support lip 117 at the bottom of opening 115 upon which utility 31/61 when in use rests allowing roots thereat to be exposed through the bottom of opening 115 to chamber 91 of basin 75 of apparatus 21 (through the void defining station 25 at structure 23 holding platform 109). Filler blanks 121 are provided to cap unused openings 115 and/or to cap an opening 115 having a utility 31/61 therein while a seed is germinating thereon, as illustrated in FIG. 5B (to provide a moisture rich environment in the opening during germination of the seed).

Single unit platforms 107 (FIG. 7, shown in use with a utility 31, though utility 61 or other multi-tiered utility as described hereinabove could be utilized, platform 107 also being usable for cuttings wherein no such utility is used) includes opening 125 through platform wall 127, the opening sized and shaped to receive a utility 31/61. Resilient yet deformable material retainer 129 and retainer lip 131 at the bottom of opening 125 (upon which a utility 31/61 rests) maintain assemblage of utility 31 and function in much the same way in this regard as retainers 45/47 (FIG. 3). Retainer 129 is made of any suitable non-volatile material (various open or closed cell foam materials could be utilized), and includes opening 133 therethrough for receipt of the plant stem after plant germination (i.e., retainer 129 is applied around a seedling after sufficient growth has occurred). Plugs similar in structure to retainer 129 can be configured for use in any of the platform openings shown herein to provide cuttings support (without use of a full utility 31/61) and/or further seedling support (with a utility 31/61).

The plant stem is positioned by deformation of retainer 129 to open the retainer along the entire length of access slit 135 allowing access to opening 133. In cases where a plant is of significant size and/or is weak stemmed (or "leggy"), further support may be necessary. In such cases, support rod 137 held in stake cavity 139 formed in platform wall 127 can be utilized to further support the plant.

Figure 9:
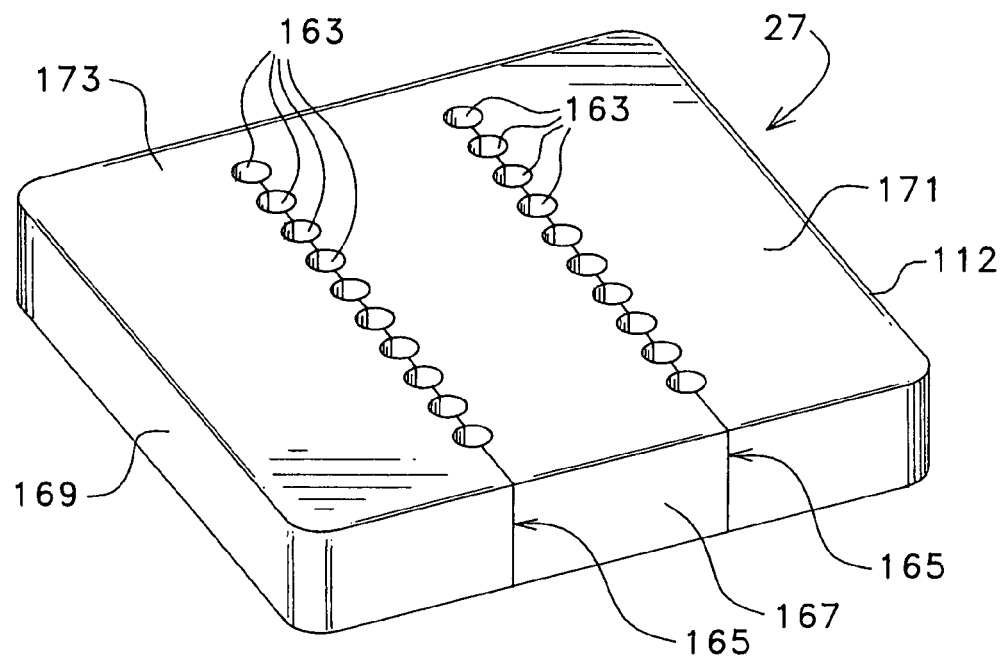
FIG. 9 is a perspective view of a second embodiment of a cutting maintenance platform.
Figure 10:
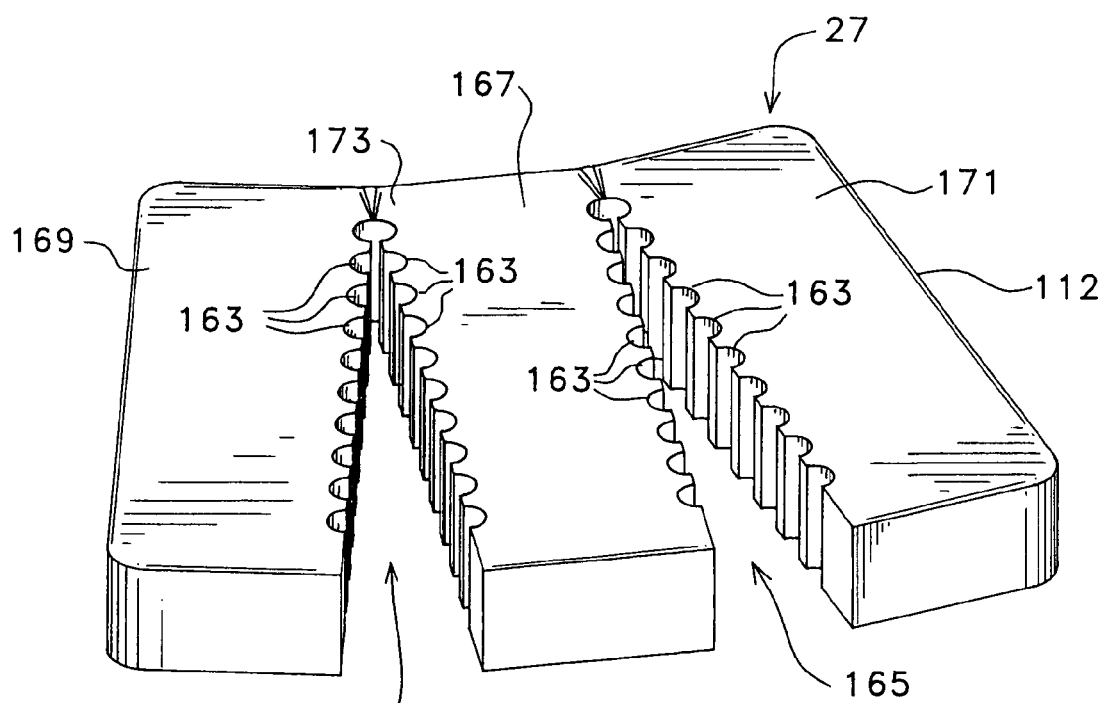
FIG. 10 is a perspective of the cutting maintenance platform of FIG. 9 opened for cutting insertion or removal.

The platform embodiments shown in FIGS. 8 through 10, while primarily designed for use with cuttings, could also be adapted for use with utilities 31/61 of this invention. FIG. 8 shows a first embodiment 111 of a cuttings support platform. In order to more gently handle cuttings and reduce cuttings damage, both during placement in the platform and during removal after root formation, platform 111 includes three readily disassociable wall segments 141, 143 and 145 (as few as two segments or as many segments as desired could be provided in various configurations of support platform 111, as may be appreciated). Guide and mounting pins 147 are embedded in segment 141 and mutable mounting holes 149 are formed in segments 143 and 145 (only the two at segment 145 are shown, it being understood that similar structure is provided at segment 143). Each wall segment, at its interface with an adjacent segment, includes portions 151 defining, with its opposite portions 151 (at the adjacent wall segment), openings 153 through platform 111 when the segments are assembled (see FIG. 5B).

A second embodiment of a readily accessible cuttings support platform 112 is illustrated in FIGS. 9 and 10. Platform 112 is a unitary structure made of resilient yet deformable non-volatile material (various open or closed cell foam materials or rubber could be utilized, for example), and is sized to fit an appropriate receiving station 25 at table 97. A plurality of openings 163 are formed therethrough along access slits 165. The openings and slits are formed so that three segments 167, 169 and 171 are provided (a lesser or greater number of segments can be formed utilizing the arrangements taught herein). A portion of each opening 163 is located along the slits at each adjacent segment (in a similar relationship as utilized for the openings defined by wall segments shown in FIG. 8), and the slits are discontinuous toward one side 173 of platform 112 (with the segments thus remaining associated thereat along side 173 as if hinged).

Cuttings are preferably inserted into openings 163 while platform 112 is undeformed (preferably in position at a receiving station 25 at table 97). For removal of the cuttings from openings 163, platform 112 is manually deformed to separate segments 167, 169 and/or 171 from each other along access slits 165 (as shown in FIG. 10) allowing access to openings 163, the platform readily regaining is shape and utility upon release.

The sizes, shapes and number of plant accommodating openings of the various platforms 27 described hereinabove may vary depending upon application, ease of manufacture, and/or aesthetic considerations.

As may be appreciated from the foregoing, this invention provides utilities for the propagation of plants in a system free of traditional root supporting media. The utilities are flexible in use, easy to manage and clean, are suitable for use by hobbyists, scientists, horticulturists and the like, and may be maintained inside the home, on patios, in greenhouses, and/or by commercial farming operations both indoors and outdoors. For many applications, utilities 31/61 may include reusable parts (retainers 55 and/or spacers 39, for example). For other applications (in particular organic farming) utilities 31/61 will be entirely biodegradable (with retainers 55 and spacers 39 made of pulp fiber material, for example).

What is claimed is:

1. A seed germination and plant supporting utility comprising:
    a spacer having a central opening therethrough between first and second sides of said spacer; and
    mesh secured on both of said sides of said spacer, wherein said mesh is held spaced apart a selected distance by said spacer and enshrouds said central opening, said mesh having mesh openings of a size small enough to directly support a seed thereon at said first side of said spacer and to be securely engaged by plant root growth therethrough at said second side of said spacer.

2. The utility of claim 1 further comprising a first retainer associable with said spacer at one of said sides thereof for holding said mesh thereat.

3. The utility of claim 2 further comprising a second retainer associable with said spacer at another of said sides thereof for holding said mesh thereat.

4. The utility of claim 1 wherein said spacer is ring shaped having an inside diameter and outside diameter, wherein said mesh includes first and second fiber swathes each with a diameter greater than said inside diameter of said spacer and each positioned at a different one of said sides of said spacer.

5. The utility of claim 4 further comprising first and second removable retainer rings each receivable over a different one of said sides of said spacer and holding said fiber swathes thereat.

6. The utility of claim 1 wherein said mesh at one of said sides of said spacer has a mesh size greater than mesh size of said mesh at another of said sides of said spacer.

7. The utility of claim 1 wherein said spacer includes first and second spacer components each defining a part of said central opening and with each having a different one of said sides of said spacer thereat, said first and second spacer components each having an interfacing surface configured to abut one another and surrounding said central opening spaced from said different one of said sides thereat, said mesh also maintained between said interface surfaces.

8. The utility of claim 1 further comprising a maintenance platform having an opening therethrough for receiving and locating said spacer and said mesh when assembled.

9. A seed germination and plant supporting utility comprising:
a first spacer having a passageway therethrough between first and second ends of said first spacer;
a first mesh swathe positioned at said first end of said first spacer and having mesh openings of a size small enough to directly support a seed thereon, and a second mesh swathe positioned at said second end of said first spacer and having mesh openings of a size small enough to be securely engaged by plant root growth therethrough; and
first and second retainers securable to said first spacer at said first and second ends thereof, respectively, adjacent to said first and second mesh swathes positioned thereat to retain said first and second mesh swathes at said first and second ends of said first spacer, each of said retainers having an opening therethrough in correspondence with said first spacer passageway when associated with said first spacer.

10. The utility of claim 9 further comprising a second spacer having a passageway therethrough between first and second ends of said second spacer, a third mesh swathe positioned at said first end of said second spacer, and a third retainer associable with said second spacer at said first end thereof adjacent to said third mesh swathe thereat, said third retainer having an opening therethrough in correspondence with said second spacer passageway when associated with said second spacer, said second retainer configured to be associable with both said first and second spacers at said second ends thereof.

11. The utility of claim 10 wherein said first and third retainers each include a retaining lip adjacent to said openings therethrough configured to abut said first ends of said first and second spacers, respectively, to thereby anchor said first and third mesh swathes.

12. The utility of claim 9 further comprising a maintenance platform having an opening therethrough, said first retainer comprising a resilient yet deformable material configured to be securely receivable in said opening through said maintenance platform, and said second retainer comprising a lip at said opening through said maintenance platform.

13. The utility of claim 9 wherein said first and second retainers each include a retaining lip adjacent to said opening therethrough configured to abut a respective one of said first and second ends of said first spacer when associated therewith to thereby anchor said first and second mesh swathes positioned thereat.

14. The utility of claim 13 wherein said spacer is ring shaped, and wherein each of said first and second retainers are defined by a ring shaped body configured to be fit over a respective one of said first spacer ends, said retaining lip extending annularly from one end of said ring shaped body inwardly at said opening therethrough.

15. A seed germination and plant supporting utility comprising:
a spacer ring having a central opening therethrough between opposite ends of said spacer ring, said spacer ring having an inside diameter adjacent said central opening and outside diameter;
first and second mesh each with a diameter greater than said inside diameter of said spacer ring and each positioned at a different one of said opposite ends of said spacer ring, said first mesh having mesh openings of a size small enough to directly support a seed thereon and said second mesh having mesh openings of a size small enough to be securely engaged by plant root growth therethrough; and
retaining means at each of said opposite ends of said spacer ring for retaining said first and second mesh at said opposite ends of said spacer ring;
wherein said first and second mesh are held spaced apart a selected distance by said spacer ring and enshroud said central opening.

16. The utility of claim 15 wherein said retaining means comprise first and second removable retainer caps having an opening therethrough each receivable over a different one of said opposite ends of said spacer ring and anchoring said first and second mesh thereat.

17. The utility of claim 15 wherein said first mesh has a mesh size greater than mesh size of said second mesh.

18. The utility of claim 15 wherein said spacer ring includes first and second spacer components each defining a part of said central opening and with each having a different one of said opposite ends of said spacer ring thereat, said first and second spacer components each having an interfacing surface configured to abut one another and surrounding said central opening spaced from said different one of said opposite ends thereat, said utility further comprising a third mesh maintained between said interface surfaces.

19. The utility of claim 15 further comprising a maintenance platform having a plurality of openings therethrough, said platform openings for receiving and locating multiple ones of said spacer ring, said first and second mesh and said retaining means when assembled.

20. The utility of claim 19 further comprising a containment and feeding apparatus and a positioning structure, said positioning structure having stations configured to receive said maintenance platform with said openings through said platform exposed from both above and below said platform and said positioning structure, said positioning structure configured to be received at said containment and feeding apparatus with said openings through said platform exposed from below to operations of said containment and feeding apparatus.

* * * * *